(12) United States Patent
Wang

(10) Patent No.: US 11,335,211 B2
(45) Date of Patent: May 17, 2022

(54) MODULAR BUILDING BLOCK EASY TO ASSEMBLE

(71) Applicant: Yeyi Wang, Shantou (CN)

(72) Inventor: Yeyi Wang, Shantou (CN)

( * ) Notice: Subject to any disclaimer, the term of this patent is extended or adjusted under 35 U.S.C. 154(b) by 0 days.

(21) Appl. No.: 17/373,712

(22) Filed: Jul. 12, 2021

(65) Prior Publication Data

US 2021/0343185 A1 Nov. 4, 2021

(30) Foreign Application Priority Data

Jun. 8, 2021 (CN) .......................... 202121272502.1

(51) Int. Cl.
*G09B 23/00* (2006.01)
*G09B 23/18* (2006.01)

(52) U.S. Cl.
CPC ......... *G09B 23/185* (2013.01); *G09B 23/182* (2013.01); *G09B 23/183* (2013.01); *G09B 23/188* (2013.01)

(58) Field of Classification Search
None
See application file for complete search history.

(56) References Cited

U.S. PATENT DOCUMENTS

| 2008/0104906 | A1 | 5/2008 | Pyo | |
| 2010/0095631 | A1 | 4/2010 | Cables | |
| 2011/0143629 | A1* | 6/2011 | Seymour | A63H 33/04 446/91 |
| 2012/0031031 | A1 | 2/2012 | Rulon | |
| 2017/0036132 | A1* | 2/2017 | Yang | A63H 33/086 |
| 2017/0291116 | A1* | 10/2017 | MacDonald | A63H 33/046 |

* cited by examiner

*Primary Examiner* — James B Hull

(57) ABSTRACT

A modular building block easy to assemble comprises a base plate, basic parts, and electronic individual components. First protrusions are disposed on the base plate and the basic parts, and slots are formed in the basic parts and the electronic individual components. First conductive pins and conductive metal sheets are disposed inside the basic parts. Control panels, electronic devices and conductive contacts are disposed inside the electronic individual components. The invention designs the base plate, basic parts and electronic individual components of original electronic building blocks as individual modules.

9 Claims, 6 Drawing Sheets

MODULAR BUILDING BLOCK EASY TO ASSEMBLE

BACKGROUND OF THE INVENTION

1. Technical Field

The invention relates to the technical field of educational toys, in particular to a modular building block easy to assemble.

2. Description of Related Art

As is commonly known, educational toys are auxiliary toys for promoting the intellectual development of students and are able to convey related knowledge to students by means of their educational properties when played by students, thus realizing a new enjoyable learning pattern.

At present, common educational toys are building blocks which can be flexibly assembled to improve the intelligence of players. With the development of science and technology, the electronic technology has been integrated into building block toys, which in turn generates electronic building blocks that fulfill a learning effect by means of analog programming of circuits based on the assembly of the building blocks and electrical connection of electronic circuits.

However, most individual components of existing building blocks can be assembled and connected, while the electronic module and the building block carrier are single pieces respectively, which limits the assembly of the building blocks due to the fact that only specific individual components may be selected to be combined and the electronic module on the individual components cannot be changed arbitrarily; moreover, the overall assembly and electrical connection forms are complicated, which makes the assembly not convenient enough.

BRIEF SUMMARY OF THE INVENTION

In view of the defects of the prior art, the objective of the invention is to provide a modular building block easy to assemble.

To fulfill the above objective, the invention adopts the following technical solution:

A modular building block easy to assemble comprises a base plate, a plurality of basic parts for connection, and electronic individual components, wherein a plurality of first protrusions are disposed on upper surfaces of the base plate and the basic parts, and slots matched and connected with the first protrusions are formed in lower surfaces of the basic parts and the electronic individual components, a plurality of sets of first conductive pins and conductive metal sheets abutting against and connected with the first conductive pins are disposed inside the basic parts, top ends of the first conductive pins penetrate through the first protrusions of the basic parts to be exposed to the outside, the conductive metal sheets are provided with elastic jaws penetrating out of side walls of the basic parts, control panels, and electronic devices and conductive contacts integrated on the control panels are disposed inside the electronic individual components, and the conductive contacts are disposed in the slots of the electronic individual components.

Preferably, the first protrusions on the base plate and the basic parts are arranged in equal proportion.

Preferably, second protrusions identical in shape and size with the first protrusions are disposed on top surfaces of the electronic individual components, second conductive pins electrically connected to the control panels are disposed inside the electronic individual components, and top ends of the second conductive pins penetrate through the second protrusions to be disposed to the outside.

Preferably, the first conductive pins and the second conductive pins are electrically connected to the conductive metal sheets and the control panels by means of conductive springs, and under the effect of the conductive springs, top ends of the first conductive pins and the second conductive pins are arched to be exposed to the outside.

Preferably, edges of the first protrusions and the second protrusions are beveled.

Preferably, openings of the slots are beveled.

Preferably, tail ends of the elastic jaws are arc-shaped and are arched to form elastic parts.

Preferably, shells of the basic parts and the electronic individual components each consist of a cover and a bottom plate, and the cover is detachably mounted on the bottom plate.

Preferably, the cover and the bottom plate are made of insulating materials.

By adoption of the above solution, the base plate, basic parts and electronic individual components of original electronic building blocks are designed as individual modules to be flexibly selected by users, thus being beneficial to learning and replacement and assembly of multiple structures; moreover, the individual modules can be pressed to be assembled easily, vertical stacked conductive assembly can be realized by means of the first conductive pins, the second conductive pins and the conductive contacts, and parallel conductive assembly of the four sides can be realized by means of the elastic jaws of the conductive metal sheets, so that the requirement for easy assembly is met, various conductive connection forms may be realized; and the building block is more interesting when played.

DETAILED DESCRIPTION OF THE INVENTION

Figure 1:
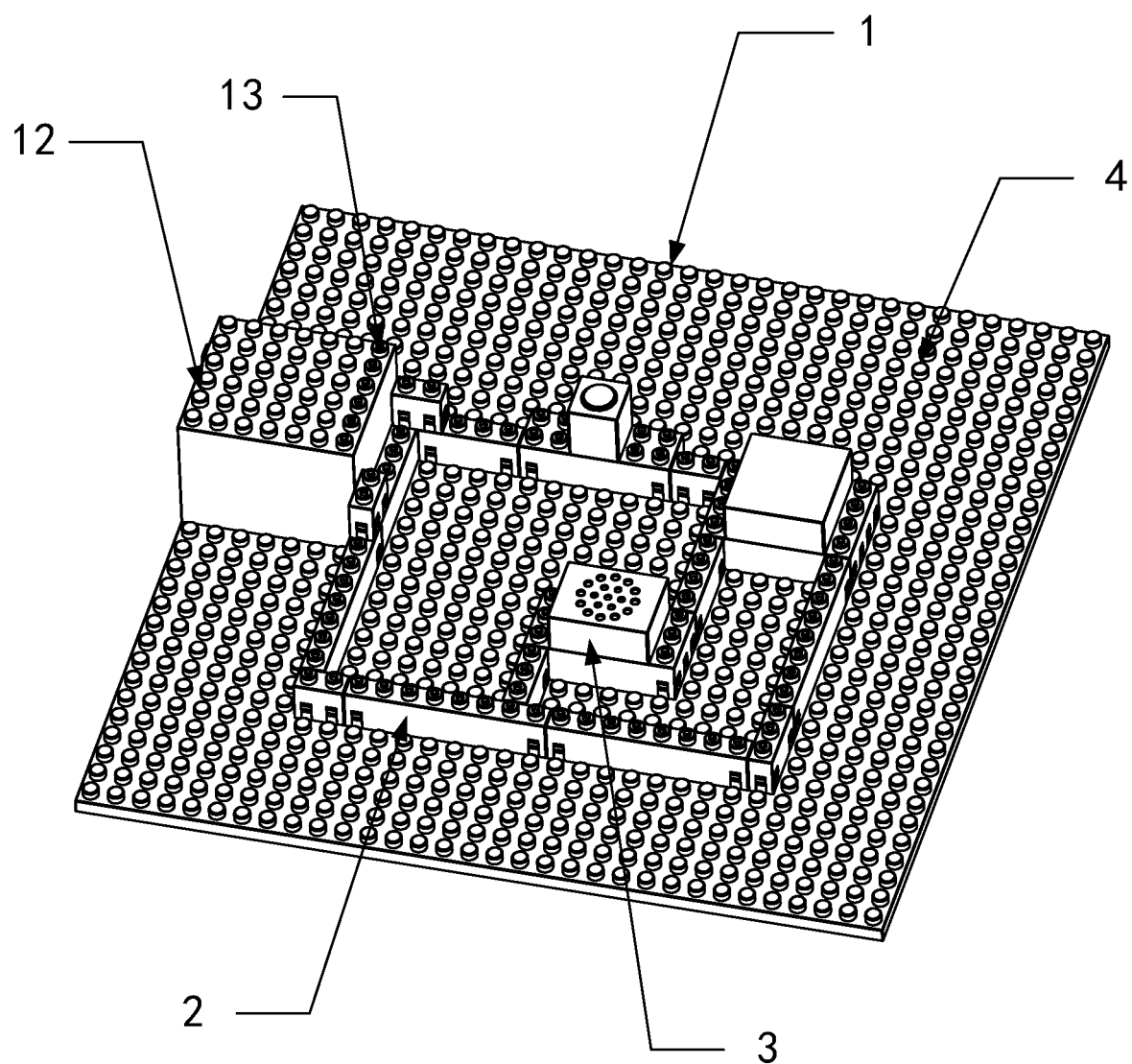
FIG. 1 is a structural principle diagram of one embodiment of the invention.
Figure 2:
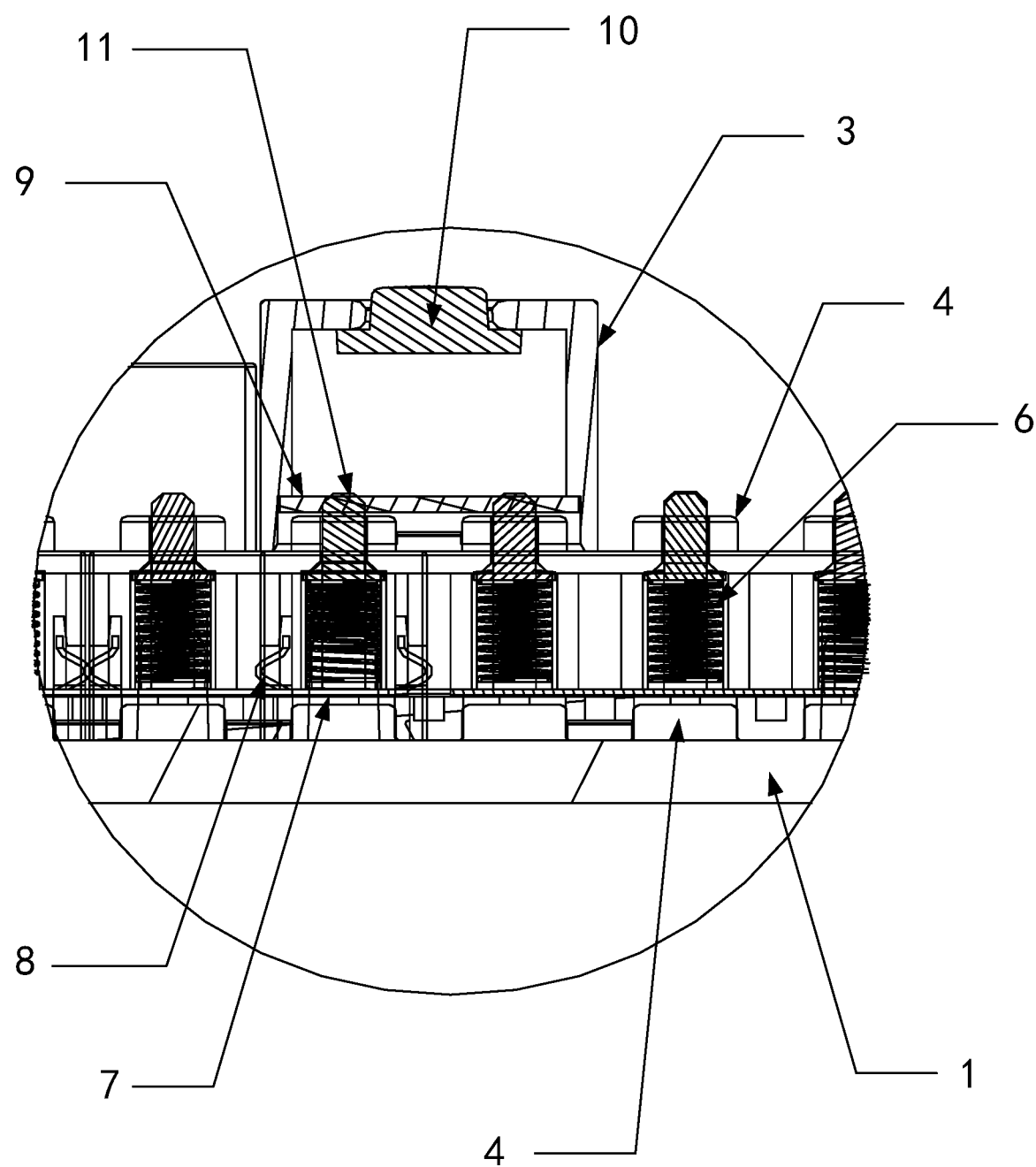
FIG. 2 is an assembled structural diagram of one embodiment of the invention.
Figure 3:
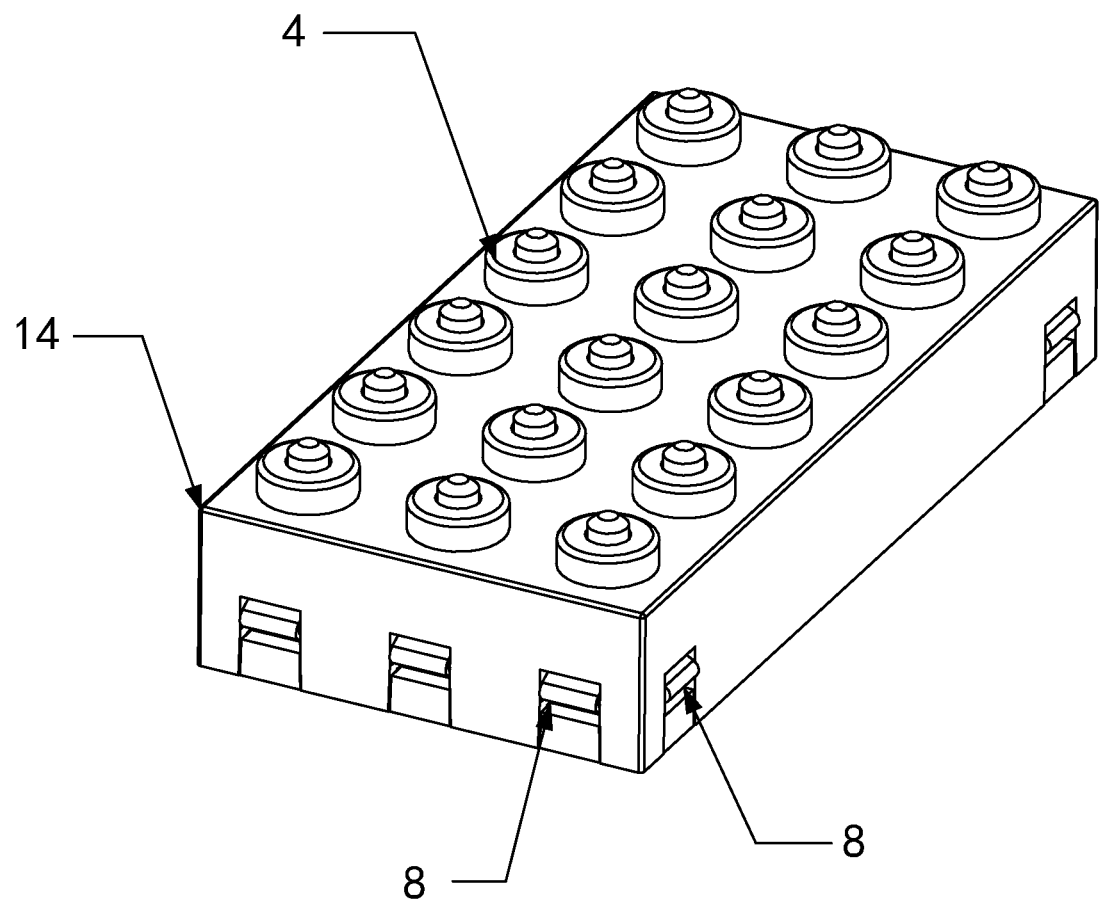
FIG. 3 is a structural diagram of a basic part in one embodiment of the invention.
Figure 4:
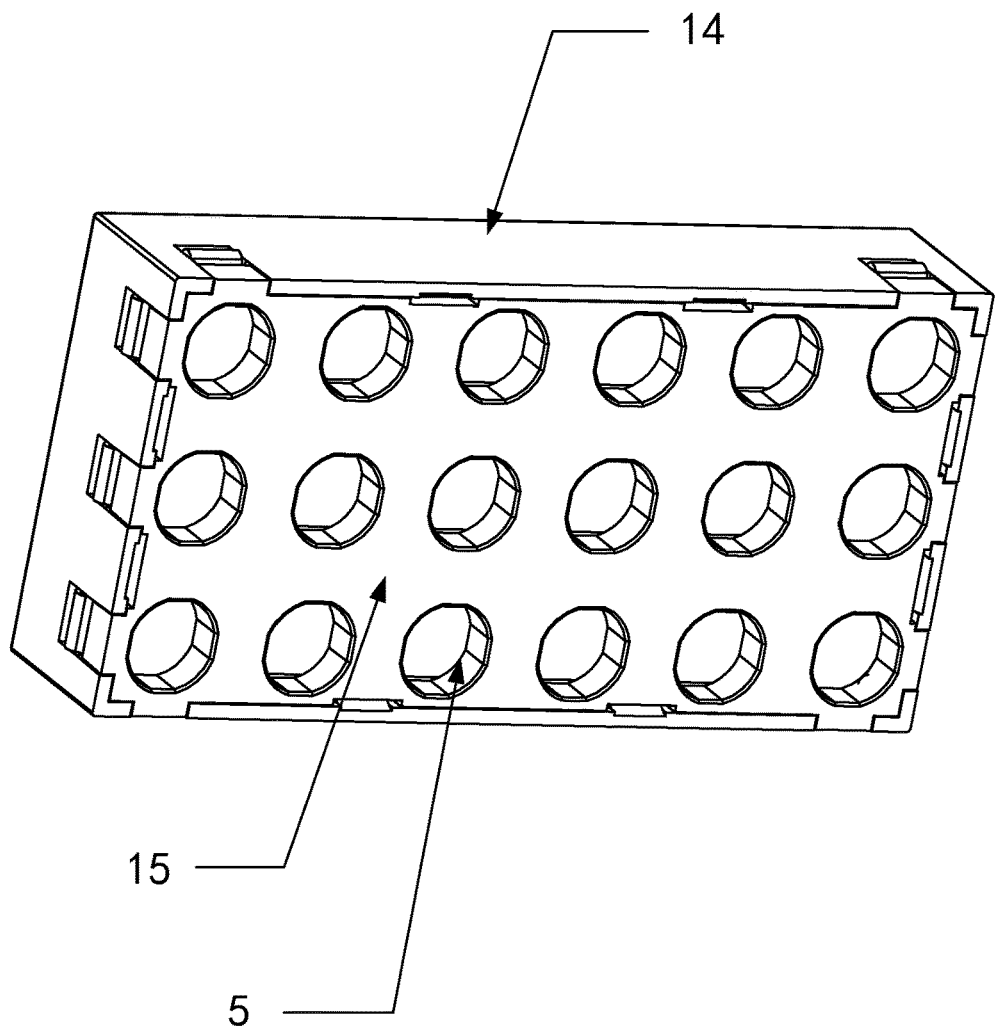
FIG. 4 is a structural diagram of the bottom of the basic part in one embodiment of the invention.
Figure 5:
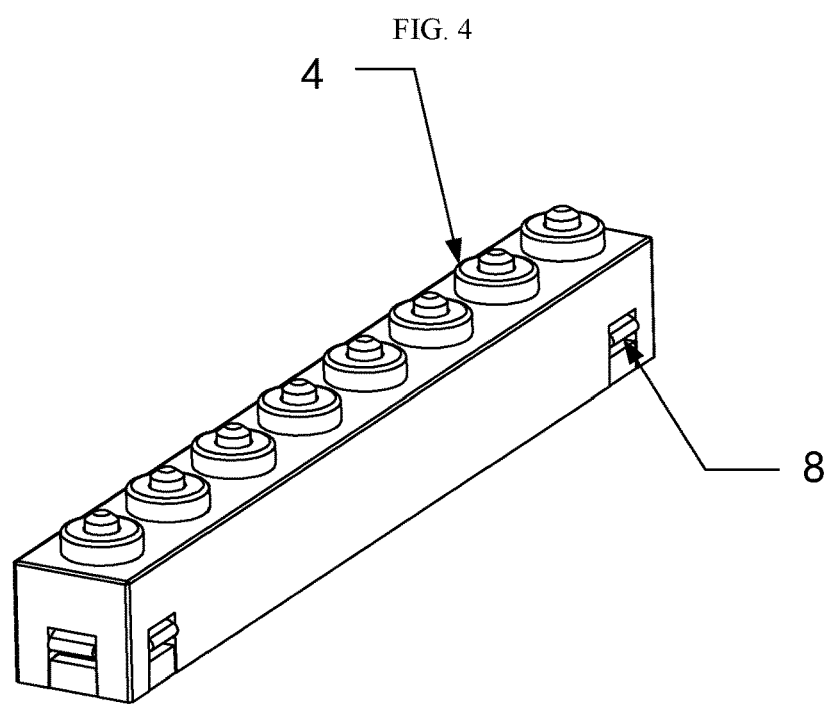
FIG. 5 is a structural diagram of the basic part, used as a wire, in one embodiment of the invention.
Figure 6:
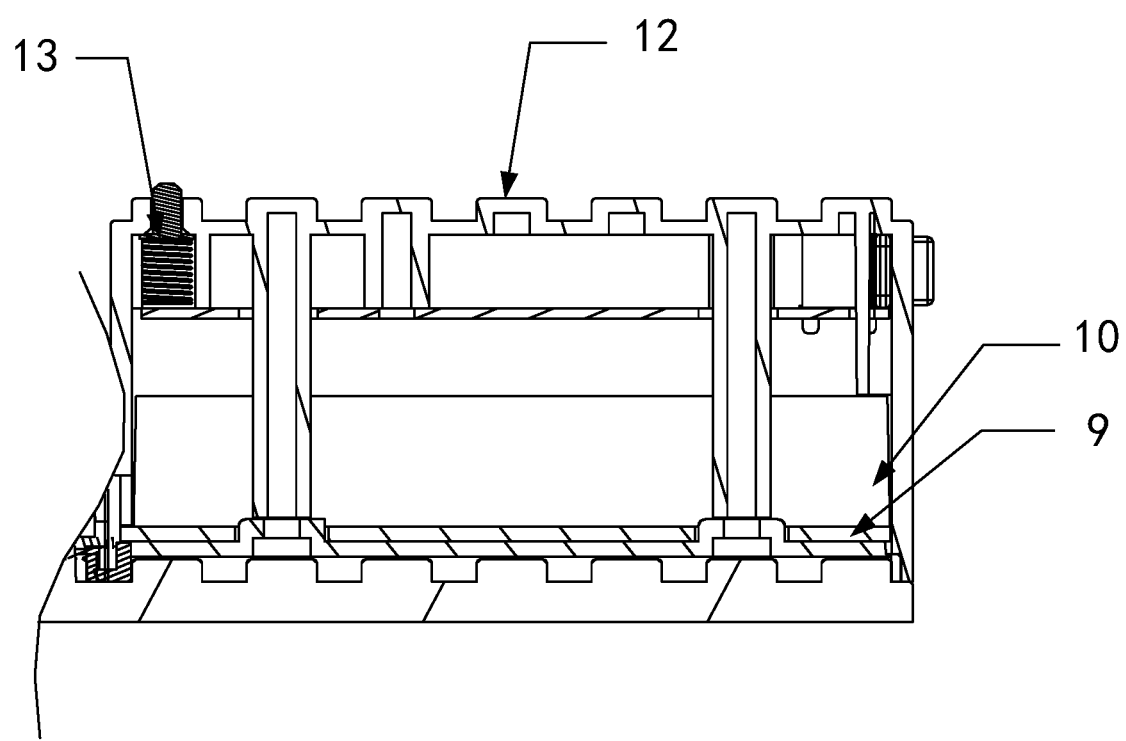
FIG. 6 is a structural diagram of an electronic individual component provided with a second conductive pin in one embodiment of the invention.
Figure 7:
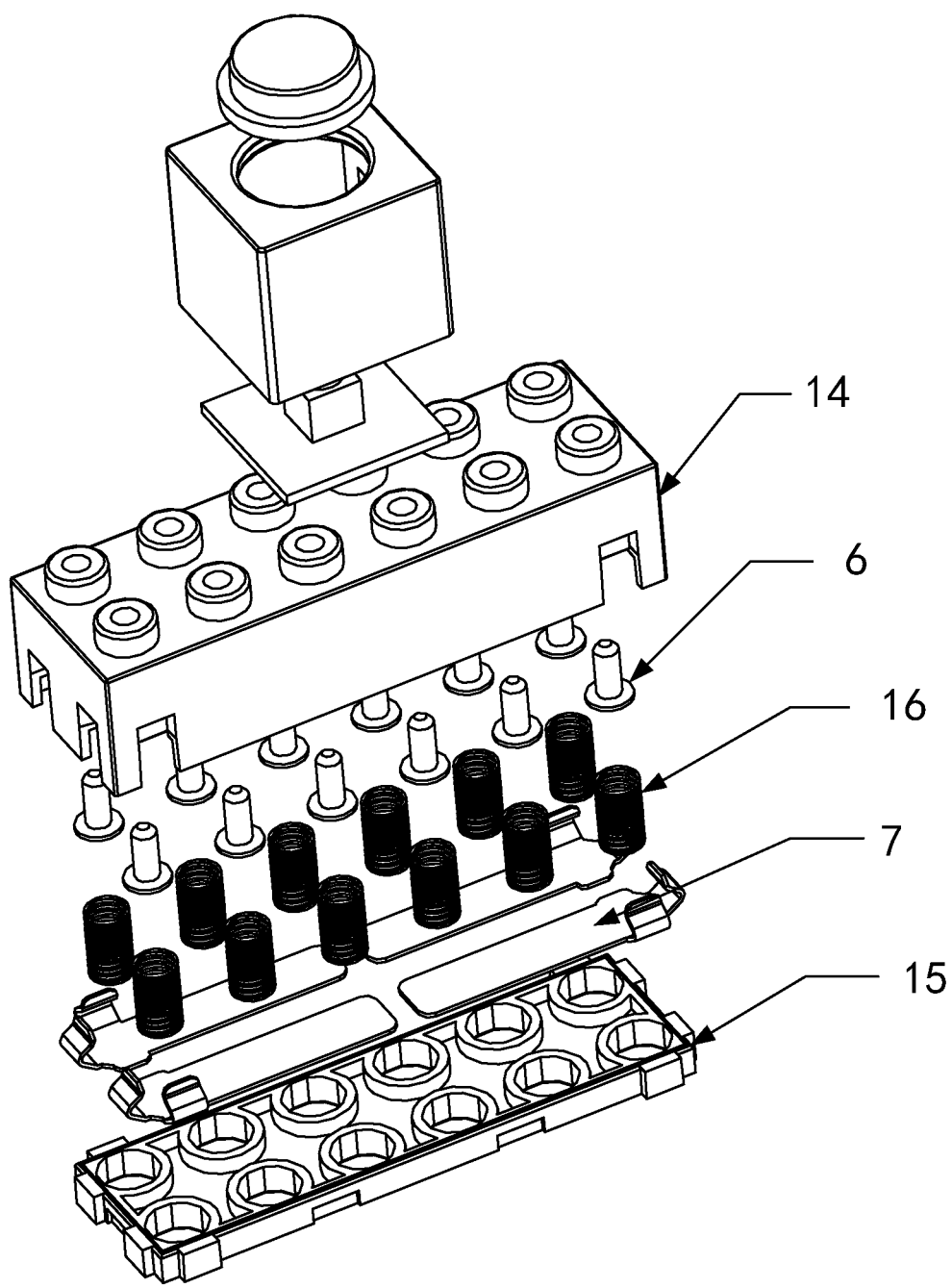
FIG. 7 is an exploded structural view of the basic part in one embodiment of the invention.

The embodiments of the invention will be described in detail below in conjunction with the accompanying drawings. Clearly, the invention may be implemented in different manners defined and covered by the claims.

As shown in FIG. 1 to FIG. 7, this embodiment provides a modular building block easy to assemble, comprising a base plate 1, a plurality of basic parts 2 for connection, and electronic individual components 3, wherein a plurality of first protrusions 4 are disposed on upper surfaces of the base plate 1 and the basic parts 2, slots 5 matched and connected with the first protrusions 4 are formed in lower surfaces of the basic parts 2 and the electronic individual components 3, a plurality of sets of first conductive pins 6 and conductive metal sheets 7 abutting against and connected with the first conductive pins 6 are disposed in the basic parts 2, top ends of the first conductive pins 6 penetrate through the first protrusions 4 of the basic parts 2 to be exposed to the outside, the conductive metal sheets 7 are provided with elastic jaws 8 protruding out of side walls of the basic parts 2, control panels 9, and electronic devices 10 and conductive contacts 11 integrated on the control panels 9 are disposed inside the electronic individual components 3, and the conductive contacts 11 are disposed in the slots 5 of the electronic individual components 3. It should be noted that the electronic devices 10 are common electronic devices such as a battery, a speaker, a switch, a button, an encoder, a motor and an LED lamp. Shells of the electronic individual components 3 may be correspondingly adjusted to adapt to different electronic devices 10. For example, if a motor is configured, a hole will be reserved in the shell of the electronic individual component 3 to allow a motor shaft to stretch out; or, if an LED lamp is configured, the shell will be made transparent, or a light hole will be reserved in the shell; or, if a battery is configured, the shell will be provided with a charge port, a battery change port, or a main switch for supplying power to the battery. Thus, it can be understood that the multiple electronic individual components 3 in this embodiment are provided with different types of electronic devices 10 and the structure of the shells of the electronic individual components 3 may be modified correspondingly according to different types of electronic devices 10. That is to say, the structure of the shells of the electronic individual components 3 and the type of the electronic devices 10 may be determined according to actual application of the product, and this embodiment has no limitation in this aspect.

When the modular building block in this embodiment is used, as shown in FIG. 1, with the base plate 1 as a basic carrier, a desired electronic individual component 3 is selected as required, that is, a combination for forming a complete circuit is selected. Next, a basic part 2 matching the electronic individual component 3 in length is selected, and then the basic part 2 and the electronic individual component 3 are assembled in a stacked manner by means of the first protrusions 4 and the slots 5. After being assembled, the basic part 2 and the electronic individual component 3 are pressed to be assembled on the first protrusions 4 on the base plate 1, so that the assembly of one electronic individual component 3 is completed. After that, the other electronic individual components 3 are assembled at other positions of the base plate 1 as defined by users, then suitable basic parts 2 are selected to be used as wires, and the basic parts 2 at lower ends of the electronic individual components 3 are electrically connected; and when the basic parts 2 are assembled in parallel, the elastic jaws 8 on side walls of the basic parts 2 will be mutually squeezed to be in contact to realize electrical connection of circuits.

Further, to meet the requirements for uniformity and random assembly of modules, the first protrusions 4 on the base plate 1 and the basic parts 2 are arranged in equal proportion in this embodiment.

Further, in this embodiment, a vertical stacked conductive assembly manner may be adopted if necessary. That is, in this embodiment, second protrusions 12 identical in shape and size with the first protrusions 4 are disposed on top surfaces of the electronic individual components 3, second conductive pins 13 electrically connected to the control panels 9 are disposed inside the electronic individual components 3, and top ends of the second conductive pins 13 penetrate through the second protrusions 13 to be exposed to the outside. Through the design of the second protrusions 13, the requirements for vertical stacked assembly and circuit conduction can be effectively met.

Further, in this embodiment, the first conductive pins 6 and the second conductive pins 13 are electrically connected to the conductive metal sheets 7 and the control panels 9 by means of conductive springs 16, and under the effect of the conductive springs 16, top ends of the first conductive pins 6 and the second conductive pins 13 are arched to be exposed to the outside. Through the design of the conductive springs 16, the requirement for elastic abutting connection and circuit conduction can be met during assembly. So, the conductive springs 16 in this embodiment need to be made of electrically conductive materials.

Further, to facilitate insertion and alignment, edges of the first protrusions 4 and the second protrusions 13 are beveled, and openings of the slots 5 are also beveled, in this embodiment.

Further, to improve the elasticity of the elastic jaws 8, tail ends of the elastic jaws 8 in this embodiment are arc-shaped and are arched to form elastic parts. Good elasticity may be provided by arc surfaces and suspended arches, such that contact-type electrical conduction can be realized more stably during parallel assembly.

Further, in this embodiment, shells of the basic parts 2 and the electronic individual components 3 each consist of a cover 14 and a bottom plate 15, wherein the cover 14 is detachably mounted on the bottom plate 15. So, internal components, such as the first conductive pins 6 and the conductive metal sheets 7 of the basic parts 2, can be selectively changed if necessary. The conductive metal sheets 7 may be changed to meet the requirements for different assembled structures. The second conductive pins 13 and the electronic devices 10 in the electronic individual components 3 can be changed or maintained.

Further, to avoid short circuits or abnormal conduction, the cover 14 and the bottom plate 15 are made of insulating materials in this embodiment.

In addition, when the modular building block is assembled to be played, it may be combined with common building blocks. That is, the modular building block may be connected to the common building blocks by means of the first protrusions 4 and the second protrusions 13 to be integrated and assembled with the common building blocks, which makes it more unique and novel and creates more combinations.

The above embodiments are merely preferred ones of the invention, and are not intended to limit the scope of the patent of invention. All equivalent structural transformations or flow transformations made based on the contents of the specification and accompanying drawings of the invention, or direct or indirect applications to other relating technical fields should also fall within the protection scope of the patent of invention.

What is claimed is:

1. A modular building block set easy to assemble, comprising a base plate, a plurality of basic parts for connection, and electronic individual components each comprising at least one control panel and at least one electronic device in electrical contact; wherein a plurality of first protrusions are disposed on upper surfaces of the base plate and the basic parts, and slots matched and connected with the first protrusions are formed in lower surfaces of the basic parts and the electronic individual components; a plurality sets of first conductive pins and conductive metal sheets abutting against and connected with the first conductive pins are disposed inside the basic parts, top ends of the first conductive pins penetrate through the first protrusions of the basic parts to be exposed to an outside; the conductive metal sheets are provided with at least one elastic jaw penetrating out of each side wall of each of the basic parts for electrical connection with other basic parts; the electronic devices are disposed inside the electronic individual components; and conductive contacts are integrated on the control panel and disposed in the slots of the electronic individual components.

2. The modular building block set easy to assemble according to claim 1, wherein the first protrusions on the base plate and the basic parts are arranged in equal proportion.

3. The modular building block set easy to assemble according to claim 2, wherein second protrusions identical in shape and size with the first protrusions are disposed on top surfaces of the electronic individual components, the electronic individual components, and top ends of the second conductive pins penetrate through the second protrusions to be disposed to the outside.

4. The modular building block set easy to assemble according to claim 3, wherein the first conductive pins and the second conductive pins are electrically connected to the conductive metal sheets and the control panels by means of conductive springs, and under the effect of the conductive springs, top ends of the first conductive pins and the second conductive pins are arched to be exposed to the outside.

5. The modular building block set easy to assemble according to claim 4, wherein edges of the first protrusions and the second protrusions are beveled.

6. The modular building block set easy to assemble according to claim 3, wherein openings of the slots are beveled.

7. The modular building block set easy to assemble according to claim 3, wherein tail ends of the elastic jaws are arc-shaped and are arched to form elastic parts.

8. The modular building block set easy to assemble according to claim 7, wherein shells of the basic parts and the electronic individual components each consist of a cover and a bottom plate, and the cover is detachably mounted on the bottom plate.

9. The modular building block set easy to assemble according to claim 8, wherein the cover and the bottom plate are made of insulating materials.

* * * * *